United States Patent Office 3,444,164
Patented May 13, 1969

3,444,164
HYDROXYPHENYL-1,3,5-TRIAZINES CONTAINING SULFONIC ACID GROUPS AND THEIR PREPARATION
Christian Luethi, Munchenstein, and Karl Eschle, Basel, Switzerland, assignors to Ciba Limited, Basel, Switzerland, a company of Switzerland
No Drawing. Filed Sept. 20, 1966, Ser. No. 580,601
Claims priority, application Switzerland, Sept. 24, 1965, 13,274/65
Int. Cl. C07f 1/08; C07d 55/12, 143/38
U.S. Cl. 260—248                    9 Claims

ABSTRACT OF THE DISCLOSURE

New aryl-1,3,5-triazine compounds are provided which are represented by the formula

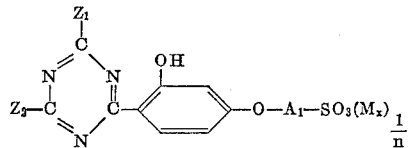

in which $A_1$ represents an alkylene group and $M_x$ a hydrogen ion, an ammonium ion or a cation of a metal of group 1a, 2a, 3 or 4b, or of the first period of the transition metals of the Periodic Table or of manganese, copper or chromium, and $n$ indicates the valency of the cation.

The compounds of this invention are especially useful as stabilizing agents for protecting organic materials from the harmful effects of ultraviolet radiation.

---

The present invention provides new hydroxyphenyl-1,3,5-triazines containing sulphonic acid groups built in in the form of alkylsulfonic acid groups, as well as processes for their manufacture and use. These new triazine derivatives may be looked upon quite generally as aryl-1,3,5-triazines containing sulphonic acid groups, corresponding to the formula (1)

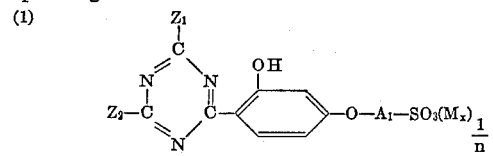

in which $Z_1$ and $Z_2$ each represents a benzene residue which may be substituted by halogen atoms, alkyl, alkoxy, hydroxyl groups or at most one phenyl group or a residue of the formula

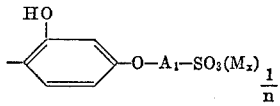

in which $A_1$ represents an alkylene group and $M_x$ a hydrogen ion, an ammonium ion or a cation of a metal of group 1a, 2a, 3 or 4b, or of the first period of the transition metals of the Periodic Table or of manganese, copper or chromium, and $n$ indicates the valency of the cation.

For most practical uses there are specially suitable phenyl-1,3,5-triazine derivatives that contain at most two alkylsulfonic acid groups and correspond to the formula

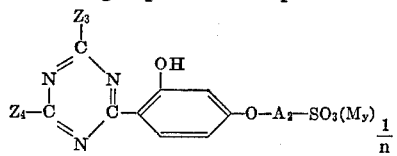

where $Z_3$ represents a benzene residue which may be substituted by a halogen atom, an alkyl, alkoxy or at most one phenyl group, $Z_4$ is a benzene residue $Z_3$ or a residue of the formula

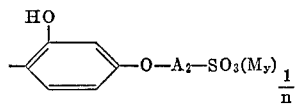

where $A_2$ represents a lower alkylene group and $M_y$ a hydrogen or ammonium ion or a cation of a metal of group 1a, 2a, 2b, 3 or 4b, of manganese, copper or chromium, or of the first period of the transition metals of the Periodic Table, and $n$ indicates the valency of the cation.

Within the scope of the above definition lower alkylene groups are above all those which contain 3 or 4 carbon atoms; preferred among the metal cations referred to above are apart from the hydrogen and ammonium ion the following which are distinguished by a similar behaviour.

In group 1a: potassium and sodium,
In group 2a: magnesium, calcium, barium,
In group 2b: zinc,
In group 3: aluminium.
In group 4b: tin, lead,
In the first period of the transition metals: iron, cobalt, nickel.

Of special importance among the products of this invention are the aryl-1,3,5-triazines which contain alkylsulfonic acid groups and correspond to the formula (3)

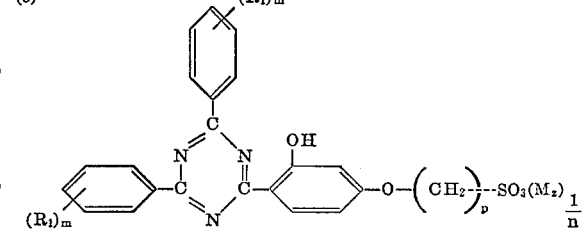

in which the residues $R_1$ are hydrogen atoms, alkyl groups with 1 to 4 carbon atoms, alkoxy groups with 1 to 4 carbon atoms or chlorine atoms; $m=1$ or 2 and indicates that the individual benzene nucleus may contain 1 or 2 substituents $R_1$; $p=3$ or 4; $M_z$ represents a cation from the series hydrogen, ammonium, alkali metal, alkaline earth metal, zinc, lead, nickel, copper, potassium or cobalt ion, and $n$ indicates the valency of the cation. Thus, as can be seen, there are particularly valuable those aryl-1,3,5-triazine derivatives whose molecule contains a single alkylsulfonic acid group. The term "lower alkyl and alkoxy group" in this connection refers to those groups which contain 1 to 6 carbon atoms.

A characteristic group of compounds corresponds to the formula (5)

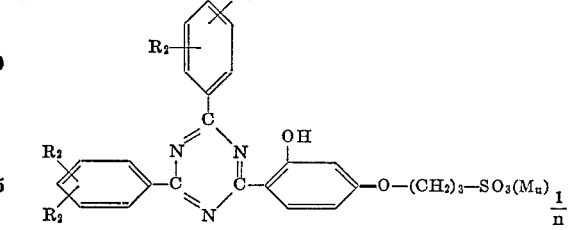

in which $R_2$ represents a hydrogen atom or an alkyl group containing 1 to 4 carbon atoms; $M_u$ represents a cation from the series sodium, potassium, calcium, barium, zinc, lead, nickel or cobalt ion, and $n$ indicates the valency of the cation.

The above-defined compounds of the Formula 1 are surprisingly obtained in a very advantageous manner when the corresponding hydroxyphenyltriazines, thus for instance the compounds of the formula (6a) 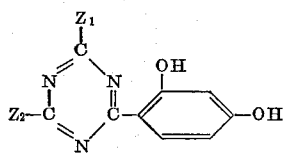

are subjected to an additive reaction with alkanesultones of the formula (6b) 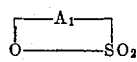

Thus it is possible in principle to add the alkanesultone on to any hydroxyl group in paraposition relatively to the bond with the triazine ring, that is to say not only those explicitly shown in the above Formula 6a but also those which may be present within the scope of the above definition of the substituents $Z_1$ and $Z_2$. Accordingly, a new type of compound containing 3 alkylsulfonic acid groups of the formula (7) 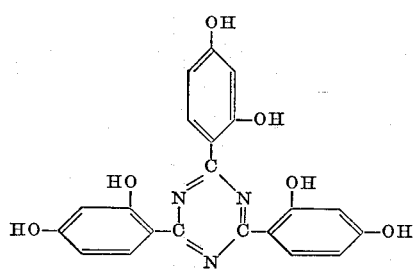

with an alkanesultone of the Formula 6b or of the formula (8) 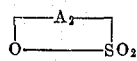

In a very similar manner the practically more valuable compounds of the Formula 2 containing at most two alkylsulfonic acid groups are accessible by adding 1 or 2 mols of an alkanesultone of the Formula 6b or preferably of the Formula 8 on to a hydroxyphenyl-1,3,5-triazine of the formula (9) 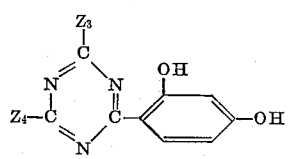

or, based on the most important representative of this type, on to a hydroxyphenyltriazine of the formula

(10) 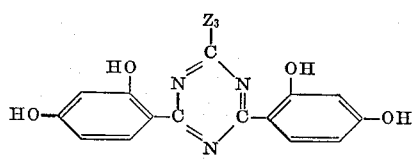

whereby compounds are obtained that correspond to the formula

(11) 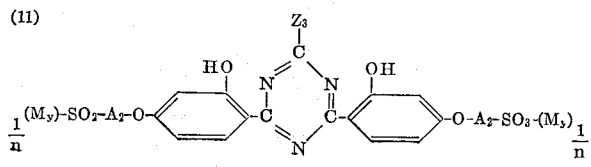

Of special importance is the addition of alkanesultones on to hydroxyphenyl-1,3,5-triazines in the case of the addition of only one mol of alkanesultone—for example according to Formula 8—on to hydroxyphenyl-1,3,5-triazines, containing a single hydroxyl group in paraposition relatively to the bond with the triazine ring, of the formula

(12) 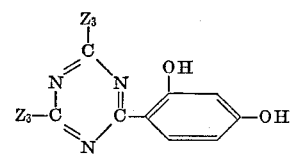

to yield compounds of the formula

(13) 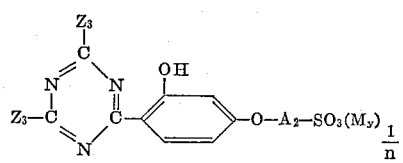

Alkanesultones particularly suitable for use in the present process are those of the formula

(14) 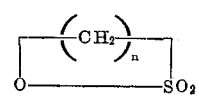

where $n=3$ or 4, that is to say 1,3-propanesultone or 1,4-butanesultone. Thus, compounds of the Formula 3 or 4 are obtained in an elegant manner by adding these sultones on to hydroxyphenyl-1,3,5-triazines of the formula

(15) 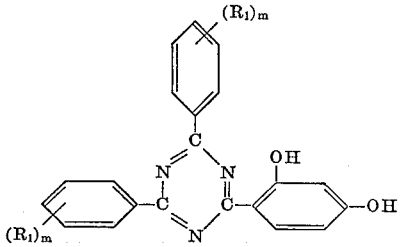

such, for example as 2,4-(phenyl)-6-(2',4'-dihydroxyphenyl)-1,3,5-triazine, 2,4-(2',4'-dimethylphenyl)-6-(2',4'-dihydroxyphenyl)-1,3,5-triazine, 2,4-(4'-chlorophenyl)-6-(2',4'-dihydroxyphenyl)-1,3,5-triazine, 2',4'-(4'-methoxyphenyl)-6-(2',4'-dihydroxyphenyl)-1,3,5-triazine.

The addition of the alkanesultones defined above on to the hydroxyphenyl-1,3,5-triazines is advantageously carried out in an organic solvent which, of course, must be chemically inert towards the reactants under the reaction conditions and must be capable of dissolving at least the alkanesultone. Such solvents are, for example, lower aliphatic monohydric alcohols such as methanol, ethanol or butanol, or ethylene-glycol monomethyl ethers, aliphatic ketones such as acetone or methylethylketone, also dioxane and dimethylsulphoxide.

The reaction is advantageously carried out in the presence of a base. Such bases may be of inorganic nature, for example alkali or alkaline earth metal hydroxides (KOH, NaOH, Ca(OH)$_2$), alkali metal carbonates (K$_2$CO$_3$, Na$_2$CO$_3$), or alkali metal alcoholates (sodium or potassium alcoholate) or of organic nature, for example pyridine bases, ion exchange resins, or the like. The amount of base used advantageously equals the equivalent quantity needed to open the sultone ring, though if desired or required a small excess of base is permissible. The reaction temperature may vary from about 10° C. to the boiling point of the reaction mixture, and is advantageously within the range from 20° to 80° C. The quantity of sultone to be used for the reaction corresponds normally to the quantity equivalent to at least the number of hydroxyl groups to be reacted, but an excess of sultone is basically not objectionable.

The sulfonates primarily obtained by the reaction, in most cases alkanesulfonates, may either be converted into the free sulphonic acids—for example by means of ion exchange resins—or directly or via the free acid with various water-soluble metal salts into salts of the kind referred to above.

The new hydroxyphenyl-1,3,5-triazines containing alkylsulfonic acid groups may be used according to this invention to stabilize a variety of organic materials against the harmful effects of light, especially ultraviolet radiation, and heat.

Of special importance is the fact that, more especially when salts of alkaline earth metals or heavy metals of the indicated kind are used, a combined protection can be achieved, namely in the first place protection against ultraviolet radiation and side by side with it substantial protection against heat.

By virtue of the solubility in water of the new compounds of the Formulae 1, 2 and 3 in the form of the free sulphonic acids or of their ammonium or alkali metal salts, a considerable choice of further, partly even preferred, spheres of applications becomes available. Thus, the stabilizers may be used in cosmetics, for stabilizing fibrous substrates (that is to say both in the textile and the non-textile sectors), in the paper and cardboard sectors, for phototechnical purposes, and in the lacquer and paint sector (latices, dispersion dyestuffs and the like).

Concerning the stabilizing effect against ultraviolet radiation compared with that of the known nuclear-sulphonated benzophenones, there may be specially mentioned a substantially higher absorptive action, a broader absorption region ($\lambda_{max}$ is nearer to the visible region of light) and the substantial absence of colour in the alkaline region.

Quite generally, it is possible with the compounds of the Formula 1 according to this invention to stabilize and protect in principle all organic materials that are damaged or destroyed in any way by the effect of ultraviolet rays. However, such damage due to the same cause, namely ultra-violet rays, may have widely disparate results, for example colour shifts (yellowing, bleaching), change in light permeability, change in the mechanical properties (embrittlement, fissuring, tear strength, bending strength, abrasion resistance, elasticity, ageing), triggering of undesired chemical reactions (decomposition of sensitive chemical substances, for example medicaments), photochemically induced rearrangements, oxidation or the like (for example oxidation of oils containing unsaturated fatty acids), the causing of burns and irritations (for example on human skin) and the like.

Accordingly, the organic materials to be protected may belong to a wide variety of types and may be present in the most diversified stages of processing and physical states, all of them having the common property of being sensitive to untraviolet radiation.

Organic materials of this kind may be of a high molecular or low-molecular nature.

As high-molecular and low-molecular substances that can be protected or stabilized by the present process there may be mentioned, for example, without any limitation thereto: Organic natural substances such as are used for pharmaceutical purposes, dyestuffs sensitive to ultraviolet rays, compounds which as victuals or in victuals are decomposed by the action of light (unsaturated fatty acids in oils) and the like.

As examples of high-molecular organic substances there may be mentioned.

I. Synthetic organic materials of high-molecular weight such as:

(a) Polymerization products based on organic compounds containing at least one polymerizable carbon-to-carbon double bond, that is to say their homopolymers or copolymers as well as their aftertreating products, for example crosslinking, grafting or decomposition products, diluted polymers, modification products obtained by modifying reactive groupings in the polymer molecule and the like, for example polymers based on $\alpha,\beta$-unsaturated carboxylic acids (for example acrylates, acrylamides, acrylonitrile), of olefinic hydrocarbons, for example $\alpha$-olefins, ethlyene, propylene or dienes, that is to say also rubbers and rubberlike polymers (also so-called ABS polymers), polymers based on vinyl and vinylidene componds (for example styrene, vinyl esters, vinychloride, vinyl alcohol), of halogenated hydrocarbons, of unsaturated aldehydes and ketones, allyl componds and the like;

(b) Other polymerization products obtainable, for example, by ring opening, for instance polyamides of the polycaprolactam type, also formaldehyde polymers, or polymers accessible by polyaddition or polycondensation, such as polyethers, polythioethers, polyacetals, thioplasts;

(c) Polycondensation products or precondensates based on bifunctional or polyfunctional compounds containing condensible groups, their homocondensates and cocondensates as well as their aftertreatment products, such, for example as polyesters [saturated (e.g., polyethylene terephthalate) or unsaturated (e.g., maleic acid-dialcohol polycondensates and their crosslinked products with copolymerizable vinyl monomers), linear or branched (also those based on polyhydric alcohols, e.g., alkyd resins)], polyamides (e.g., hexamethylenediamine adiapate), maleinate resins, melamine resins, phenolic resins (e.g., novolaks), aniline resins, furan resins, carbamide resins and their precondensates and similarly constituted products; polycarbonates, silicone resins and the like;

(d) Polyadducts, such as polyurethanes (crosslinked and not crosslinked); epoxy resins.

II. Semisynthetic organic materials, for example cellulose esters and mixed esters (cellulose acetate or propionate), nitrocellulose, cellulose ethers, regenerated cellulose (viscose rayon, cuprammonium cellulose) or their aftertreatment products; casein synthetics.

III. Natural organic materials of animal or vetetable origin, for example those based on cellulose or proteins such as wool, cotton, silk, bast, jute, hemp, pelts and hairs, leathers, finely divided wood pulp, natural resins (such as colophony, especially lacquer resins), gelatin, glues, also rubber, gutta percha, balata and their aftertreatment and modification products, degradation products, products accessible by modification or reactive groups.

The organic materials concerned may be at widely differing stages of their processing (raw materials, semi-finished products or finished products) and physical states. They may be in the form of products shaped in a wide variety of ways, that is to say, for example, as predominantly three-dimensional objects such as sections, vessels or components of a great variety, chips or granules, foamed products; predominantly two-dimensional materials such as films, foils, lacquers, impregnations or coatings or predominantly undimensional materials such as filaments, fibres, flocks, bristles or wires.

The said materials may also be in unshaped states in a wide variety of homogeneous or inhomogeneous forms of distribution and physical states, for example in the form of powders, solutions, normal and reversed emulsions (creams), dispersions, latices, sols, gels, putties, waxes, adhesives or pore fillers, and the like.

Fibrous materials may be used in a wide variety of processing forms, for example as textile threads, yarns, fibre fleeces, padding, flocculated materials or as textile fabrics or textile laminates, knitwear, papers, cardboards and the like.

The new stabilizers may also be used, for example, as follows:

(a) In cosmetics, such as perfumes, dyed or undyed soaps and bath salts, skin and face creams, powders, repellants and especially sunburn oils and creams;

(b) In admixture with dyestuffs or pigments or as additives to dyebaths, printing, discharge or reserve pastes, also for aftertreating dyeings, prints or discharge prints;

(c) In admixture with so-called carriers, antioxidants, other light filters, heat stabilizers or chemical bleaches;

(d) In admixture with crosslinking agents or dressing agents such as starch or synthetically produced dressings;

(e) In combination with detergents (the detergents and stabilizers may, if desired, be added separately to the washing liquors);

(f) In gelatin layers used in photography;

(g) In combination with polymeric vehicles (products of polymerization, polycondensation or polyaddition) in which the stabilizers, if desired in addition to other substances, are incorporated in the dissolved or dispersed form, for example in coating, impregnating or binding agents (solutions, dispersions, emulsions) for textiles, fleeces, papers, leathers);

(h) As additives to a wide variety of industrial products to reduce the speed of their ageing, for example as additives to glues, adhesives, paints or the like.

If the protective compounds of this invention are to be used for the treatment of textile organic materials of native or synthetic origin, for example textile fabrics, they may be applied to the substrate to be protected at any desired phase of the final processing of the latter, such as during a dressing or anticrease finishing or dyeing process or during any other finishing operation, by way of a fixing operation similar to a dyeing process.

Furthermore, the new stabilizers to be used according to this invention may be added to or incorporated with the materials prior to or during their shaping. Thus, for example, they may be added to the moulding or injection moulding compositions used in the manufacture of films, foils, tapes or mouldings, or they may be dissolved or dispersed or in any other way finely distributed in the spinning mass before it is spun. The protective compounds may also be added to the starting substances, reaction mixtures or intermediates used in the manufacture of fully synthetic or semisynthetic organic materials, that is to say also before or during the chemical reaction, for example in a polycondensation (including precondensates), in a polymerization (including prepolymers) or in a polyaddition.

An important sphere of application of the stabilizers to be used in the invention consists in incorporating these substances in a protective layer used to protect material placed behind it. This application may take the form of applying the ultraviolet absorber to the surface layer (of a film or of a fibre of a multidimensional shaped object). This can be done for example similar to a dyeing process, or the active substance may be embedded in a polymer (polycondensate or polyadduct) film by one of the known surface coating methods with polymeric substances, or the active substance may be dissolved in a suitable solvent and caused to diffuse or swell into the surface layer. According to another important variant the ultraviolet absorber is embedded in a self-supporting, substantially two-dimensional carrier material, for example a foil or the wall of a vessel, in order to keep ultraviolet rays away from the substance located behind it (relevant examples: shop windows, films, transparent packages, bottles).

From the foregoing it is self-evident that in addition to the protection of the substrate or carrier material containing the ultraviolet absorber also other substances contained in the substrate or carrier material are protected, for example dyestuffs, antioxidants, disinfectants, antistatics and other dressing agents, softeners and fillers.

Depending on the type of substance to be protected or stabilized, on the sensitivity or the form in which the protection and stabilization is to be imparted, the requisite amount of stabilizer may vary within wide limits, for example from about 0.01 to 10% by weight, referred to the amount of substance to be protected. For most practical purposes, however, a quantity from about 0.05 to 2% will suffice.

Accordingly, as results from the foregoing, the process for protecting organic materials from the effect of ultraviolet radiation and heat consists in homogeneously distributing a compound of one of the Formulae 1 to 4 in the organic material to be protected, or applying it to the surface of said material or coating the material to be protected with a filter layer containing one of the compounds mentioned.

In particular, this is advantageously done by homogeneously incorporating a compound of the Formula 2, 3 or 4 in the dissolved or dispersed form in an amount of 0.05 to 2.0% by weight (referred to the weight of the material to be protected) in the organic material to be protected before the latter undergoes its final shaping.

If the substance to be used according to this invention is to be applied to the surface of the substrate to be protected, thus for instance a fibrous material (fabric), this is advantageously done by immersing the substrate to be protected in a liquor in which the triazine compound is dissolved or dispersed. Suitable relevant solvents are, for example, methanol, ethanol, acetone, ethyl acetate, methylethylketone, cyclohexanol and above all water. The substrate to be treated is left in the liquor for some time, similar to the way that dyeing processes are carried out; as a rule, 10 minutes to 24 hours at 10° to 120° C. suffice, during which, if desired, the liquor may be agitated. Finally, the material is rinsed, if necessary washed, and dried.

Unless otherwise indicated, parts and percentages in the following examples are by weight. The melting points are uncorrected.

EXAMPLE 1

5.7 parts of solid potassium hydroxide and 40 parts of 2,4-di-(2',4'-methylphenyl) - 6 - (2',4',-dihydroxyphenyl)- 1,3,5-triazine [prepared according to French Patent 1,379,138] are dissolved in 800 parts of acetone at 35° C. Within ½ hour a solution of 12.2 parts of propanesultone in 120 parts of acetone is dropped in. The resulting suspension is then stirred for 2 hours at 35° C., then for 2 hours at 45° C. and finally refluxed for 18 hours. The whole is cooled with ice, the resulting precipitate is suctioned off and rinsed with 200 parts of acetone and dried, to yield 50 to 55 parts of the compound of the formula (16)

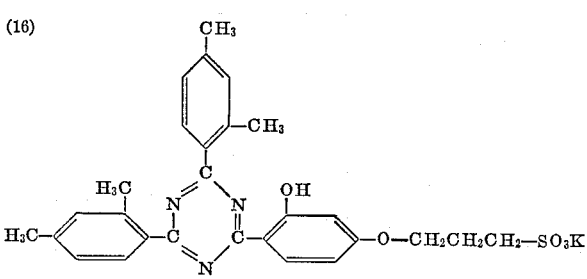

which, after having been recrystallized from dimethylformamide and alcohol of 80% strength, melts above 330° C. and reveals the following analytical data.

Calculated for $C_{28}H_{28}O_5N_3KS \cdot \frac{1}{2}H_2O$: C, 59.39; H, 5.17; N, 7.41; S, 5.66; K, 6.91%. Found: C, 59.49; H, 5.24; N, 7.25; S, 5.62; K, 7.10%.

When potassium hydroxide is replaced by an equivalent quantity of sodium hydroxide, the corresponding sodium compound is obtained.

An ion exchange reaction with a dilute aqueous solution of the compound of the Formula 16 on a cation exchange resin in the H+-form at 60° C. furnishes the free acid of the formula

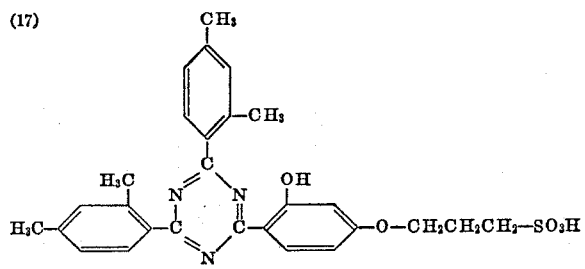

Calculated for $C_{56}H_{56}O_{10}N_6S_2Pb \cdot 1½H_2O$: C, 52.85; H, 4.68; N, 6.60; S, 5.04%. Found: C, 52.97; H, 4.76; N, 6.65; S, 5.10%.

When the 20 parts of $Pb(NO_3)_2$ are replaced by 16 parts of $BaCl_2 \cdot 2H_2O$ and the reaction is carried out otherwise in exactly identical manner, there are obtained 5.1 parts of the compound of the formula

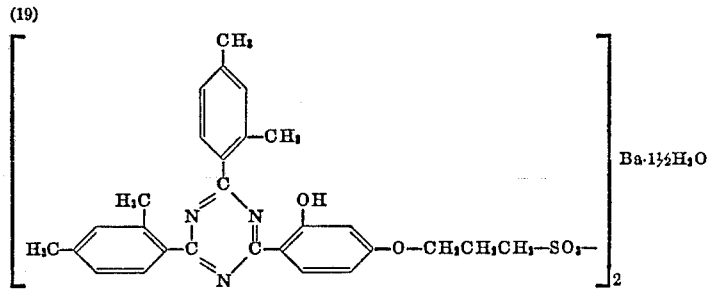

which likewise does not melt below 320° C.

Analysis.—Calculated for $C_{56}H_{56}O_{10}N_6S_2Ba \cdot 1½H_2O$: C, 55.98; H, 4.94; N, 6.99; S, 5.33%. Found: C, 56.03; H, 4.94; N, 7.03; S, 5.44%.

When the 20 parts of $Pb(NO_3)_2$ are replaced by 18 parts of $NiCl_2 \cdot 6H_2O$, an analogous reaction (digesting the precipitate for 2 hours at 90° C. makes it easier to suction-filter it) furnishes 5.3 parts of the compound of the formula

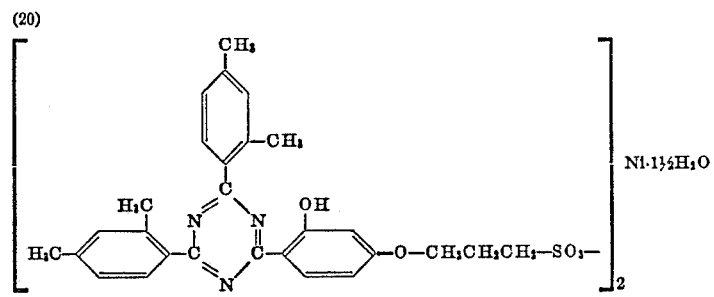

EXAMPLE 2

5.7 parts of the compound of the Formula 16 are dissolved with heating in 300 parts of water. While still warm, the solution is stirred at 70 to 80° C. into a solution of 20 parts of $Pb(NO_3)_2$ in 200 parts of water. After cooling to 15° C., the precipitate formed is suctioned off, thoroughly washed with water and then dried under vacuum at 120° C., to yield 6.3 parts of the compound of the formula which sinters at 230° C. and melts at 290 to 320° C. with decomposition.

Recrystallization from chlorobenzene+gasoline containing a small quantity of alcohol yields a product which reveals the following analytical data.

Calculated for $C_{56}H_{56}O_{10}N_6S_2Ni \cdot 1½H_2O$: C, 59.92; H, 5.30; N, 7.48; S, 5.71%. Found: C, 59.90; H, 5.49; N, 7.45; S, 5.99%.

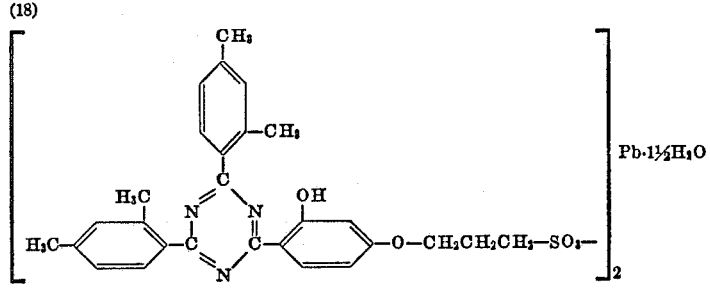

which slightly sinters at 230° C. and does not melt up to 320° C. After one recrystallization from aqueous dimethylformamide, the compound reveals the following analytical data.

When the 20 parts of $Pb(NO_3)_2$ are replaced by 25 parts of $CoSO_4 \cdot 7H_2O$ and the reaction is carried out in identical manner there are obtained (after digesting the precipitate for 2 hours at 90° C.) 5.0 parts of the compound of the formula

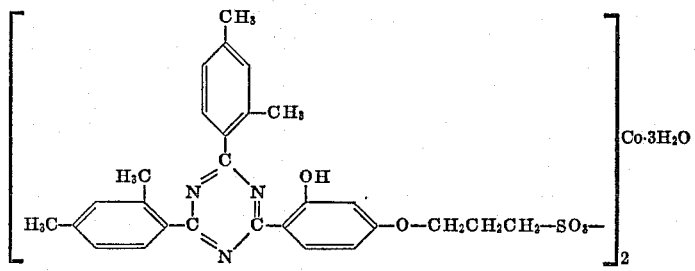

which melts at 295 to 300° C. and after recrystallization from chlorobenzene+alcohol/gasoline reveals the following analytical data.

Calculated for $C_{56}H_{56}O_{10}N_6S_2Co \cdot 3H_2O$: C, 58.50; H, 5.44; N, 7.31; S, 5.57%. Found: C, 58.47; H, 5.59; N, 7.34; S, 5.79%.

When the 20 parts of $Pb(NO_3)_2$ are replaced by 15 parts of $ZnCl_2$ and the reaction is carried out in analogous manner there are obtained (after stirring the batch for 20 hours at 20° C.) 5.4 parts of the compound of the formula

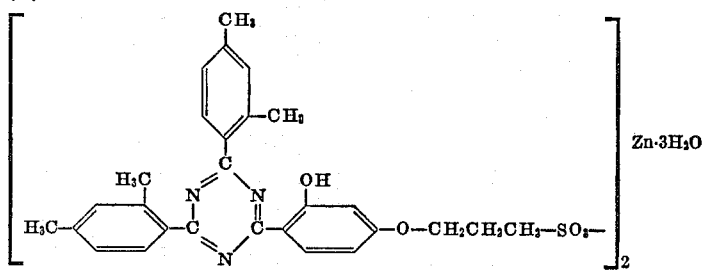

which melts at 250 to 256° C. with decomposition and after recrystallization from chlorobenzene+hexane reveals the following analytical data.

Calculated for $C_{56}H_{56}O_{10}N_6S_2Zn \cdot 3H_2O$: C, 58.16; H, 5.41; N, 7.27; S, 5.55%. Found: 58.33; H, 5.52; N, 7.17; S, 5.77%.

When the 20 parts of $Pb(NO_3)_2$ are replaced by 12 parts of $CaCl_2$, an analogous reaction furnishes 5.6 parts of the compound of the formula

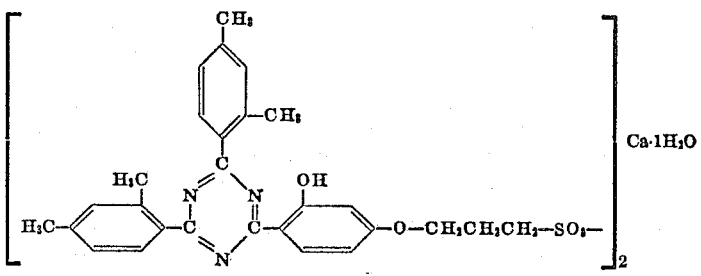

which does not melt below 310° C. and after recrystallization from dimethylformamide+water (3:1)/acetone reveals the following analytical data.

Calculated for $C_{56}H_{56}O_{10}N_6S_2Ca \cdot 1H_2O$: C, 61.40; H, 5.34; N, 7.66; S, 5.86; Ca, 3.65%. Found: C, 61.46; H, 5.49; N, 7.74; S, 6.06; Ca, 3.64%.

When the 20 parts of $Pb(NO_3)_2$ are replaced by 20 parts of $CuCl_2$, an analogous reaction furnishes 4.9 parts of the compound of the formula

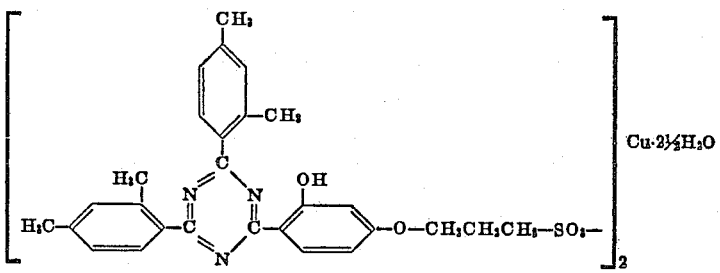

which melts above 188° C. with decomposition and after recrystallization from chlorobenzene+gasoline reveals the following analytical data.

Calculated for $C_{56}H_{56}O_{10}N_6S_2Cu \cdot 2½H_2O$: C, 58.75; H, 5.33; N, 7.33; S, 5.59%. Found: C, 58.83; H, 5.46; N, 7.18; S, 5.84%.

When the 20 parts of Pb(NO$_3$)$_2$ are replaced by 25 parts of CdCl$_2$, an analogous reaction furnishes 3.5 parts of the compound of the formula

(25)
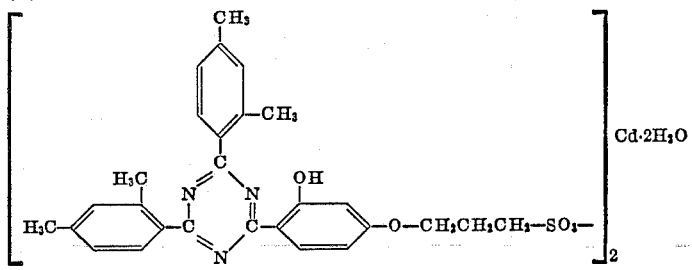

which melts above 310° C. and after recrystallization from dimethylformamide+acetone+water (1:3:1) reveals the following analytical data:

Calculated for C$_{56}$H$_{56}$O$_{10}$N$_6$S$_2$Cd·2H$_2$O: C, 56.74; H, 5.10; N, 7.08%. Found: C, 56.32; H, 5.02; N, 7.11%.

EXAMPLE 3

When in Example 1 the 40 parts of 2,4-di-(2',4'-dimethylphenyl)-6-(2',4'-dihydroxyphenyl) - 1,3,5-triazine are replaced by 34.1 parts of 2,4-diphenyl-6-(2',4'-dihydroxyphenyl)-1,3,5-triazine [prepared according to Belgian Patent 625,007], proceeding otherwise in identical manner, there are obtained 45.3 parts of the compound of the formula

(26)
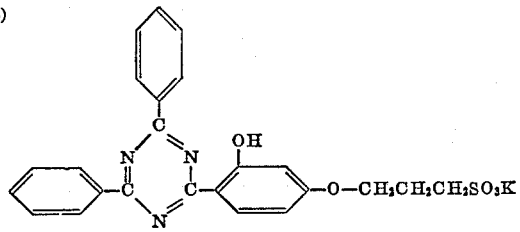

which is suspended in alcohol, dissolved in water at the boil, allowed to cool, suctioned off and washed with alcohol and dried at 120° C. It melts above 300° C. and reveals the following analytical data.

Calculated for C$_{24}$H$_{20}$O$_5$N$_3$SK: C, 57.47; H, 4.02; N, 8.38; K, 7.80%. Found: 57.52; H, 4.05; N, 8.32; K, 7.50%.

EXAMPLE 4

16.3 parts of 2-(4'-chlorophenyl)-4,6-(2',4'-dihydroxyphenyl)-1,3,5-triazine and 4.7 parts of solid potassium hydroxide are dissolved at 45° C. in 140 parts of ethylene glycol monomethyl ether. After cooling to 20° C., 11.7 parts of propanesultone in 90 parts of ethylene glycol monomethyl ether are added. The whole is then reacted for 2 hours each at 20° C., 40° C. and 60° C. and for 16 hours at 80° C., cooled, and the suspension is made up with acetone to twice its volume. The whole is stirred for one hour in an ice bath, suctioned, rinsed with acetone and dried at 120° C. under vacuum, to yield 26 parts of the compound of the formula

(27)
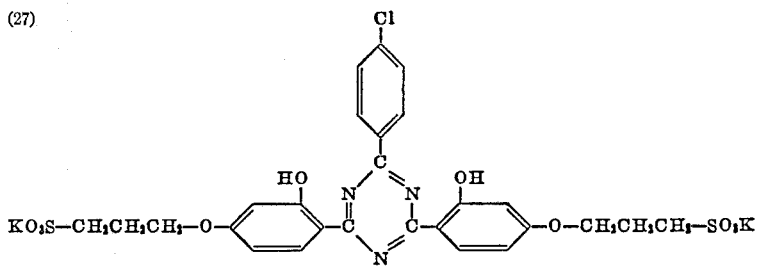

For purification the compound is dissolved in 300 parts of warm water and at the boil alcohol is added until the whole turns turbid; it is then cooled, and 3.5 parts of an impurity are filtered off. The filtrate is concentrated to 150 parts and precipitated with alcohol. Yield: 15 parts of a hygroscopic compound which reveals the following analytical data.

Calculated for C$_{27}$H$_{24}$O$_{10}$N$_3$K$_2$S$_2$Cl·½H$_2$O (mol. weight 737.3): C, 44.0; H, 3.42; N, 5.70; S, 8.69; Cl, 4.81%. Found: C, 44.2; H, 3.47; N, 5.65; S, 8.61; Cl, 4.71%.

A similar reaction with the use of 15 parts of 2-phenyl-4,6-(2',4'-dihydroxyphenyl) - 1,3,5 - triazine furnishes 28.7 parts of the compound of the formula

(28)
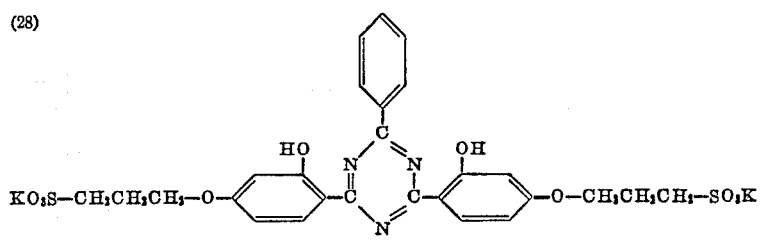

melted above 300° C. For recrystallization, the compound is dissolved in water, the volume of the solution is doubled with dimethylformamide and the whole is then concentrated until a precipitate appears.

Calculated for $C_{27}H_{25}O_{10}N_3S_2K_2$: C, 46.74; H, 3.63; N, 6.06%. Found: C, 46.87; H, 3.47; N, 6.19%.

When in an analogous reaction 17.1 parts of 2-(4'-tertiary butylphenyl) - 4,6-(2',4'-dihydroxyphenyl)-1,3,5-triazine are used, there are obtained 26.0 parts of the compound of the formula (29)

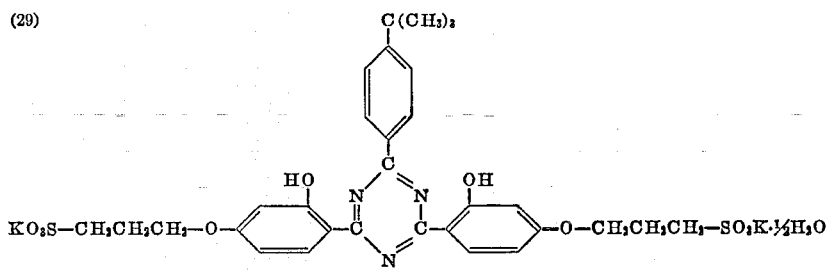

melting above 310° C.

Calculated for $C_{31}H_{33}O_{10}N_3S_2K_2 \cdot \frac{1}{2}H_2O$: C, 49.03; H, 4.52; N, 5.53; S, 8.45; K, 10.30%. Found: C, 49.05; H, 4.83; N, 5.35; S, 8.70; K, 10.22%.

When in an analogous reaction 16.1 parts of 2-(4'-methoxyphenyl) - 4,6 - (2',4' - dihydroxyphenyl) - 1,3,5 - triazine are used, there are obtained 28.2 parts of the compound of the formula (30)

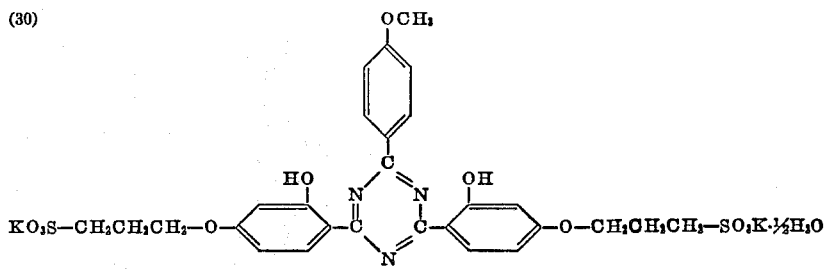

melting above 300° C.

Calculated for $C_{28}H_{27}O_{11}N_3S_2K_2 \cdot \frac{1}{2}H_2O$: C, 45.88; H, 3.85; N, 5.73; S, 8.75; K, 10.68%. Found: C, 45.69; H, 4.27; N, 5.78, S, 8.61; K, 10.75%.

When in an analogous reaction 18.4 parts of 2-(4'-phenylylphenyl) - 4,6 - (2',4' - dihydroxyphenyl) - 1,3,5 - triazine and 3.44 parts of sodium hydroxide are used, there are obtained 28.5 parts of the compound of the formula (31)

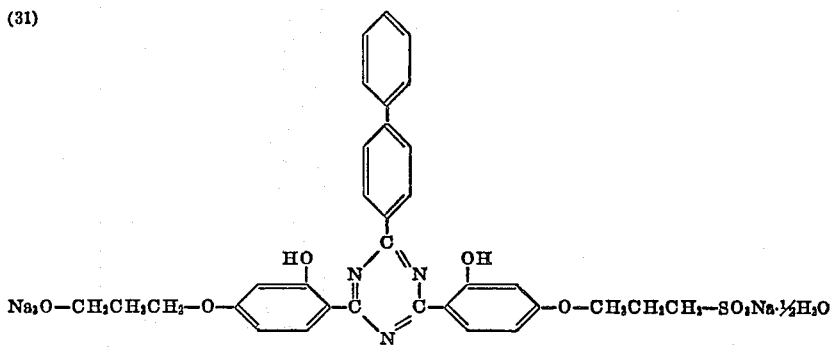

melting at 300° C.

Calculated for $C_{33}H_{29}O_{10}N_3S_2Na_2 \cdot \frac{1}{2}H_2O$: C, 53.08; H, 4.23; N, 5.62; S, 8.58; Na, 6.16%. Found: C, 52.93; H, 3.84; N, 5.76; S, 8.81; Na, 6.29%.

EXAMPLE 5

15 parts of 2-phenyl-4,6-(2',4'-dihydroxyphenyl)-1,3,5-triazine and a solution of 2.4 parts of potassium hydroxide in 5 parts of water are dissolved at 20° C. in 200 parts of ethylene glycol monomethyl ether. At 10° C. a solution of 4.9 parts of propanesultone in 40 parts of ethylene glycol monomethyl ether is added. The whole is then stirred for 4 hours at 10° C., for 14 hours at 20° C., for 6 hours at 40° C. and for 12 hours at 60° C., 400 parts of acetone are added, the batch is cooled in ice, suctioned and the filter cake is rinsed with acetone and dried, to yield 10 parts of a crude product which is dissolved in 100 parts of water. Alcohol is added to the solution at the boil until a turbidity appears; the batch is then cooled to room temperature, the precipitate formed is suctioned off, and the mother liquor is evaporated to dryness. The evaporation residue (3.1 parts) does not melt up to 300° C. and corresponds to the formula (32)

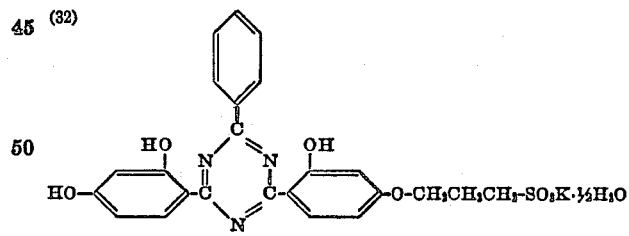

Calculated for $C_{24}H_{20}N_3O_7SK \cdot \frac{1}{2}H_2O$: C, 53.18; H, 3.90; N, 7.75; S, 5.91; K, 7.20%. Found: C, 53.58; H, 4.10; N, 7.71; S, 6.12; K, 6.88%.

EXAMPLE 6

A mixture of 16 parts of 2,4,6-tris(2',4'-dihydroxyphenyl)1,3,5-triazine, 17.8 parts of sodium hydroxide and 300 parts of acetone is stirred for a short time at the reflux temperature, then cooled to 20° C. and mixed with a solution of 16.6 parts of propanesultone in 110 parts of acetone. The batch is stirred for 12 hours each at 20° C., 35° C., 50° C. and then under reflux, then cooled in ice, suctioned and washed with acetone. After drying at 120° C. under vacuum there are obtained 35.8 parts of the product of the formula (33)

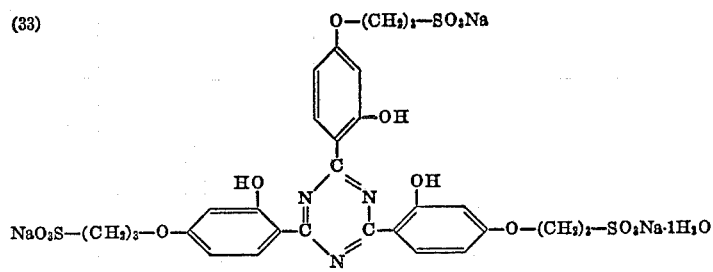

which is recrystallized from aqueous alcohol. It melts above 300° C. and reveals the following analytical data.

Calculated for $C_{30}H_{30}O_{15}N_3S_3Na_3 \cdot 1H_2O$: C, 42.08 H, 3.77; N, 4.91; S, 11.23; Na, 8.06%. Found: C, 41.93; H, 3.82; N, 4.77; S, 11.05; Na, 8.11%.

EXAMPLE 7

When in Example 1 the 12.2 parts of propanesultone are replaced by 13.6 parts of butanesultone and the 5.7 parts of potassium hydroxide by 4.1 parts of sodium hydroxide, an analogous reaction furnishes 38.7 parts of the compound of the formula (34)

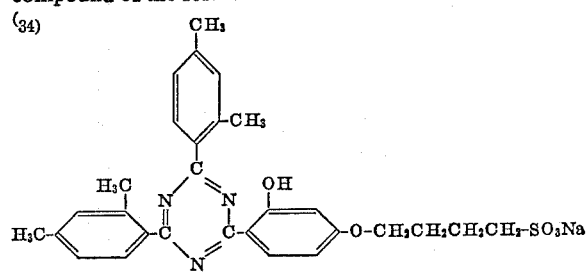

which, after recrystallization from aqueous alcohol, melts above 300° C. and reveals the following analytical data.

Calculated for $C_{29}H_{30}O_5N_3SNa$: C, 62.69 H, 5.44; N, 7.56; S, 5.77%. Found: C, 62.72; H, 5.50; N, 7.66; S, 5.53%.

EXAMPLE 8

12.8 parts of the compound of the Formula 28 are dissolved with heating in an adequate quantity of 4 N-hydrochloric acid. At the boil a sufficiency of acetone is added to produce a turbidity; the batch is cooled in an ice bath, suctioned and the filter cake is rinsed with acetone. The suctioned-off product is once more recrystallized in identical manner; after having been dried at 120° C. under vacuum it melts above 255° C. with decomposition and corresponds to the formula (35)

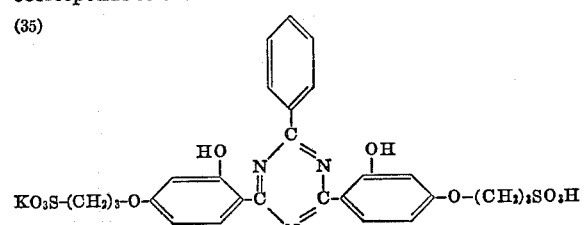

and reveals the following analytical data.

Calculated for $C_{27}H_{26}O_{10}N_3S_2K$: C, 49.43; H, 3.98; N, 6.41; S, 9.77; K, 5.96%. Found: C, 49.32; H, 4.04; N, 6.37; S, 9.74; K, 5.56%.

EXAMPLE 9

6.95 parts of the compound of the Formula 28 are dissolved in 400 parts of water at 70° C. The farm solution is poured over an ion exchange resin column, likewise heated at 70° C., in the H+-form (16 parts of "Dowex 50W," referred to the dry weight of the resin) and the column is rinsed with 100 parts of water. The eluate is evaporated to dryness in a rotary evaporator. The resulting residue is dried at 120° C. under vacuum, to yield 4.9 parts of the compound of the formula (36)

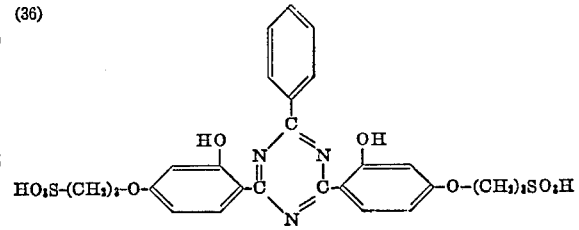

Calculated for $C_{27}H_{27}O_{10}N_3S_2$: C, 52.50; H, 4.41; N, 6.80; S, 10.38%. Found: C, 52.47; H, 4.42; N, 6.74; S, 10.29%.

EXAMPLE 10

A film about 60 microns thick is prepared from a 10% acetonic solution of acetyl cellulose which contains, referred to acetyl cellulose, 1% of the compound of the Formula 16. The dried film reveals the following percentage values of light transmission:

| | Light transmission in percent | |
| --- | --- | --- |
| Wavelength in m$\mu$ | Unexposed | Exposed for 100 hours in a fadeometer |
| 280 to 350 | 0 | 0 |
| 360 | 14 | 15 |
| 370 | 43 | 45 |
| 380 | 74 | 74 |
| 390 | 85 | 85 |

EXAMPLE 11

12.5 parts of an aqueous solution containing 0.07 part of the compound of the Formula 16 are stirred into 87.5 parts of a gelatin solution heated to 50° C. (87 parts of dry gelatin dissolved in 1000 parts of water). A specimen of the mixture is poured out over a plate of glass and dried under vacuum for 20 hours at 50° C. This procedure furnishes a completely transparent film which (referred to the dry weight) contains 1% of the compound of the Formula 16 and absorbs ultraviolet light up to about 380 m$\mu$. It is no darker than a gelatin film cast without adding the compound of the Formula 16.

EXAMPLE 12

A paste from 100 parts of polyvinyl chloride, 59 parts by volume of dioctylphthalate and 0.1 part of the compound of the Formula 20 is rolled on a calender at 145 to 150° C. to form a foil about 0.5 mm. thick. The polyvinyl chloride foil obtained in this manner absorbs completely within the region from 280 to 370 mμ. When the foil is heated for 2 hours at 170° C., less yellowing and embrittlement is observed than in a foil that does not contain the compound of the Formula 20.

Similar results are obtained when the compound of the Formula 20 is replaced by the compound of the Formula 19 or 21.

EXAMPLE 13

3 parts of the compound of the Formula 28 are dissolved in 67 parts of water, and 5 parts of propylene glycol and 25 parts of rectified alcohol are added. The resulting sunburn preparation displays a good absorptive effect against ultraviolet radiation up to the visible region of rays and thus prevents burning of the skin.

Equally good results are obtained when the compound of the Formula 28 is replaced by the compound (29) or (30).

EXAMPLE 14

10 parts of glycerin monostearate, 4 parts of cetyl alcohol, 1 part of sodium cetyl sulphate, 1 part of stearic acid and 5 parts of glycerin are emulsified with 75 parts of a 5% solution of the compound of the Formula 28. The resulting emulsion is very suitable for use as a nonfatty skin cream which protects the treated skin areas completely from sun rays. In a similar manner the compound of the Formula 29 or 30 may be used.

When the compound of the Formula 28 is replaced by the compound (16) or (26), dissolved in water at 75° C. to form a solution of 3% strength, a sunburn preparation is obtained which passes some of the tanning rays but protects the skin effectively from burns.

What is claimed is:

1. The aryl-1,3,5-triazine containing sulfonic acid groups, corresponding to the formula

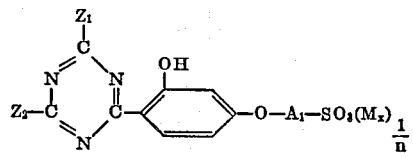

in which $Z_1$ and $Z_2$ each represents a benzene residue containing a substituent selected from the group consisting of hydrogen, halogen, alkyl with 1 to 4 carbon atoms, alkoxy with 1 to 4 carbon atoms, hydroxyl, phenyl and a residue of the formula

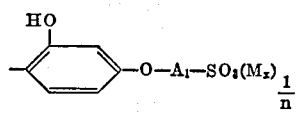

in which $A_1$ represents an alkylene group containing 3 to 4 carbon atoms and $M_x$ a member selected from the group consisting of hydrogen, ammonium ion, a cation of a metal of group 1a, 2a, 2b, 3, 4b and of the first period of the transition metals of the Periodic Table of Elements, of manganese, copper and chromium, and $n$ indicates the valency of the cation.

2. The phenyl-1,3,5-triazine according to claim 1, which corresponds to the formula

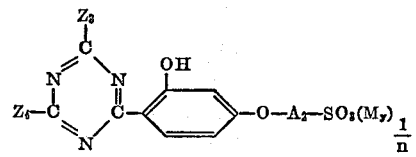

where $Z_3$ represents a benzene residue containing a substituent selected from the group consisting of hydrogen, halogen, alkyl with 1 to 4 carbon atoms, alkoxy with 1 to 4 carbon atoms and the phenyl group, $Z_4$ represents a member selected from the group consisting of a benzene residue $Z_3$ and a residue of the formula

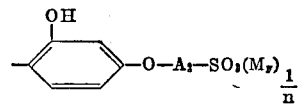

where $A_2$ represents an alkylene group containing 3 to 4 carbon atoms and $M_y$ stands for a member selected from the group consisting of hydrogen, ammonium ion, a cation of a metal of groups 1a, 2a, 2b, 3, 4b, of manganese, copper, chromium and of the first period of the transition metals of the Periodic Table of Elements, and $n$ indicates the valency of the cation.

3. The aryl-1,3,5-triazine according to claim 1 of the formula

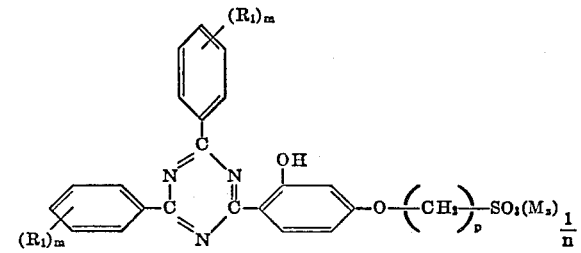

where the residue $R_1$ represents a member selected from the group consisting of hydrogen, alkyl with 1 to 4 carbon atoms, an alkoxy group with 1 to 4 carbon atoms and chlorine; $m$ is a whole number from 1 to 2 and $p$ is a whole number from 3 to 4; $M_z$ represents a cation selected from the group consisting of hydrogen, ammonium, alkali metal, alkaline earth metal, zinc, lead, nickel, copper, cadmium and cobalt ion, and $n$ indicates the valency of the cation.

4. The aryl-1,3,5-triazine according to claim 1 of the formula

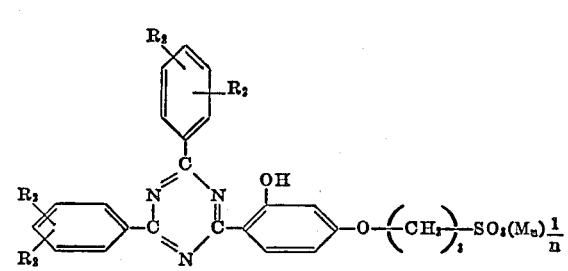

where $R_2$ represents a member selected from the group consisting of hydrogen and an alkyl group containing 1 to 4 carbon atoms; $M_u$ represents a cation selected from the group consisting of sodium, potassium, calcium, barium, zinc, lead, nickel and cobalt ion, and $n$ indicates the valency of the cation.

5. A compound according to claim 1 and corresponding to the formula

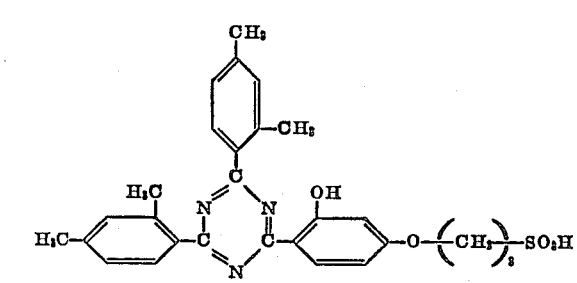

and a salt thereof with the metal cation selected from the group consisting of sodium, potassium, calcium, barium, zinc and lead.

6. A compound of the formula
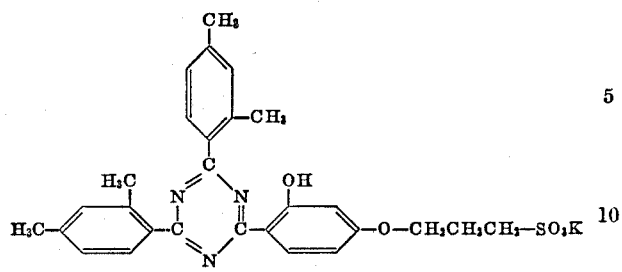
7. A compound of the formula
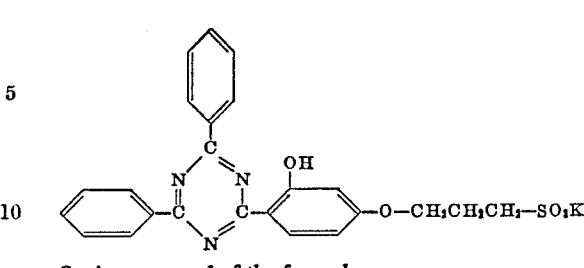
8. A compound of the formula
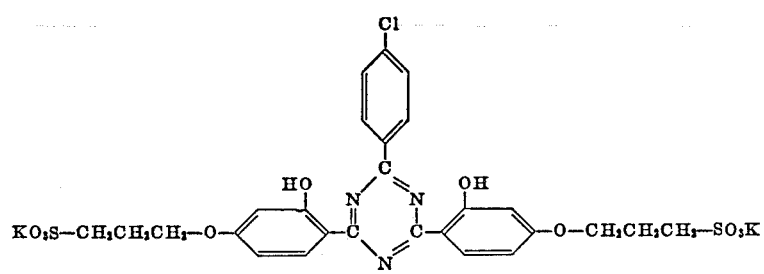
9. A compound of the formula
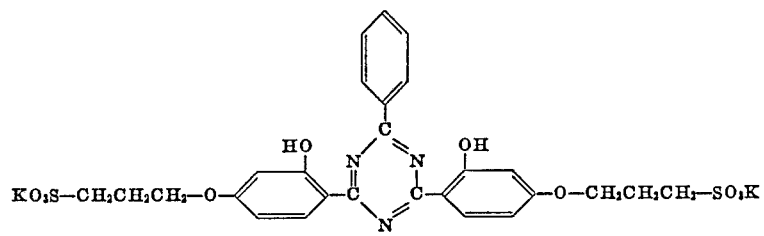
References Cited
UNITED STATES PATENTS
2,298,533   10/1942   Hentrich et al. _____ 260—248
HENRY R. JILES, *Primary Examiner.*
JOHN M. FORD, *Assistant Examiner.*
U.S. Cl. X.R.
8—115.6, 116.2, 127.6, 128; 106—176; 117—138.5, 138.8, 139, 142, 144, 147, 154; 167—85, 94, 90, 91, 92; 252—300; 260—45.8, 242, 814